United States Patent [19]

Yant

[11] Patent Number: 5,366,053
[45] Date of Patent: Nov. 22, 1994

[54] VEHICLE TRANSMISSION HILL HOLDER WITH RELEASABLE TOOTHED CLUTCH

[75] Inventor: Kenneth B. Yant, Oregon, Ohio
[73] Assignee: Dana Corporation, Toledo, Ohio
[21] Appl. No.: 956,677
[22] Filed: Oct. 5, 1992
[51] Int. Cl.$^5$ .............................................. B60K 41/26
[52] U.S. Cl. ........................................ 192/4 A; 192/7; 188/82.3
[58] Field of Search ................ 192/4 A, 4 C, 7; 188/82.3, 82.4

[56] References Cited

U.S. PATENT DOCUMENTS

| | | | |
|---|---|---|---|
| 1,597,198 | 8/1926 | Howell | 192/108 X |
| 2,038,985 | 4/1936 | Browne | 188/30 |
| 2,049,798 | 8/1936 | Booth et al. | 188/30 |
| 2,135,896 | 11/1938 | Jameson | 192/4 A |
| 2,135,897 | 11/1938 | Jameson | 192/4 A |
| 2,221,190 | 11/1940 | Hunter | 192/4 A X |
| 2,255,582 | 9/1941 | Hackett et al. | 192/4 A |
| 2,296,619 | 9/1942 | Rauen | 192/4 A |
| 2,299,765 | 10/1942 | Rauen | 192/4 A |
| 2,379,829 | 7/1945 | Russell | 192/4 A X |
| 2,609,901 | 9/1952 | Rauen | 192/4 A |
| 2,981,388 | 4/1961 | Péras | 192/4 A |
| 4,515,259 | 5/1985 | Ha | 192/4 A X |
| 4,582,184 | 4/1986 | Taig et al. | 192/13 A |
| 4,646,903 | 3/1987 | Han | 192/4 A X |
| 4,648,289 | 3/1987 | Kubo | 74/866 |
| 4,650,046 | 3/1987 | Parsons | 192/4 A X |
| 4,715,483 | 12/1987 | Hobson et al. | 192/4 A |
| 4,867,291 | 9/1989 | Holman et al. | 192/4 A |

FOREIGN PATENT DOCUMENTS

| | | |
|---|---|---|
| 2562483 | 10/1985 | France . |
| 55-22502 | 6/1977 | Japan . |
| 167983 | 3/1934 | Switzerland .............. 192/4 A |
| 187466 | 10/1922 | United Kingdom . |
| 278875 | 10/1927 | United Kingdom . |
| 512514 | 9/1939 | United Kingdom . |

Primary Examiner—Andrea L. Pitts
Attorney, Agent, or Firm—MacMillan, Sobanski & Todd

[57] ABSTRACT

A hill holder cooperates with a countershaft in a vehicle transmission to permit rotational movement thereof in one direction while preventing rotational movement thereof in an opposite direction. The hill holder includes a cylindrical housing which is supported on a rear wall of a bell housing of the transmission in co-axial relationship with the countershaft. A clutch assembly is provided in the hill holder for selectively connecting the countershaft to the housing to prevent rotation thereof in one rotational direction. The clutch assembly includes a hub member which is secured to the countershaft for rotation therewith. The clutch assembly further includes a reaction member which is axially movable relative to the housing, but is restrained from rotating relative thereto. Mating ramp-shaped teeth are formed on adjacent end faces of the hub member and the reaction member. A fluid actuated piston is provided for moving the reaction member between a disengaged position, wherein the teeth are not engaged and the countershaft is free to rotate in either direction, to an engaged position, wherein the teeth are engaged and the countershaft is free to rotate in only one direction.

20 Claims, 2 Drawing Sheets

VEHICLE TRANSMISSION HILL HOLDER WITH RELEASABLE TOOTHED CLUTCH

BACKGROUND OF THE INVENTION

This invention relates in general to vehicle transmissions and in particular to an improved structure for a hill holder adapted for use with a manual or automated manual vehicle transmission.

It is well known that a driver of a vehicle having a manual transmission must generally use both feet to operate same. Typically, the right foot is used to operate both the accelerator pedal and the brake pedal, while the left foot is used to operate the clutch pedal. So long as the vehicle is driven over relatively flat terrain, this manipulation of three pedals with two feet is usually not inconvenient. However, when the vehicle is driven over hilly terrain, such operation can be challenging.

For example, to stop the vehicle on an ascending incline, the driver normally uses the left foot to depress the clutch pedal (to disconnect the transmission from the engine) and simultaneously uses the right foot to depress the brake pedal (to stop the vehicle and hold it stationary). Thereafter, to continue up the ascending incline, the driver must rapidly move the right foot from the brake pedal to the accelerator pedal (to increase the speed of the engine) and simultaneously move the left foot to gradually release the clutch pedal (to re-connect the transmission to the engine). This procedure is awkward at best because the weight of the vehicle causes it to roll backward down the incline as soon as the brake pedal is released. As a result, the clutch is often engaged too quickly, causing the vehicle to lurch forward and occasionally causing the engine to stall.

To address this situation, it is known to provide a manual transmission with a mechanism which is commonly referred to as a hill holder. A hill holder is a device which is designed to prevent a vehicle from rolling in a direction which is opposite to the direction for which movement has been selected in the transmission. For example, if a forward gear ratio is selected in the transmission, the hill holder will prevent the vehicle from rolling in the reverse direction, such as might occur in the situation described above. A number of hill holders are known in the art. However, known hill holders are rather complicated, employing a relatively large number of components. As a result, known hill holders are expensive and difficult to construct and maintain. Accordingly, it would be desirable to provide an improved structure for a hill holder which is simpler and less expensive in construction than known structures.

SUMMARY OF THE INVENTION

This invention relates to an improved structure for a hill holder adapted for use in a vehicle transmission. The hill holder cooperates with a countershaft or other portion of the transmission to permit rotational movement thereof in one direction while preventing rotational movement thereof in an opposite direction. The hill holder includes a cylindrical housing which is supported on a rear wall of a bell housing of the transmission in co-axial relationship with the countershaft. A clutch assembly is provided in the hill holder for selectively connecting the countershaft to the housing to prevent rotation thereof in one rotational direction. The clutch assembly includes a hub member which is secured to the countershaft for rotation therewith. The clutch assembly further includes a reaction member which is axially movable relative to the housing, but is restrained from rotating relative thereto. Mating ramp-shaped teeth are formed on adjacent end faces of the hub member and the reaction member. Means are provided for moving the reaction member between a disengaged position, wherein the teeth are not engaged and the countershaft is free to rotate in either direction, to an engaged position, wherein the teeth are engaged and the countershaft is free to rotate in only one direction.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
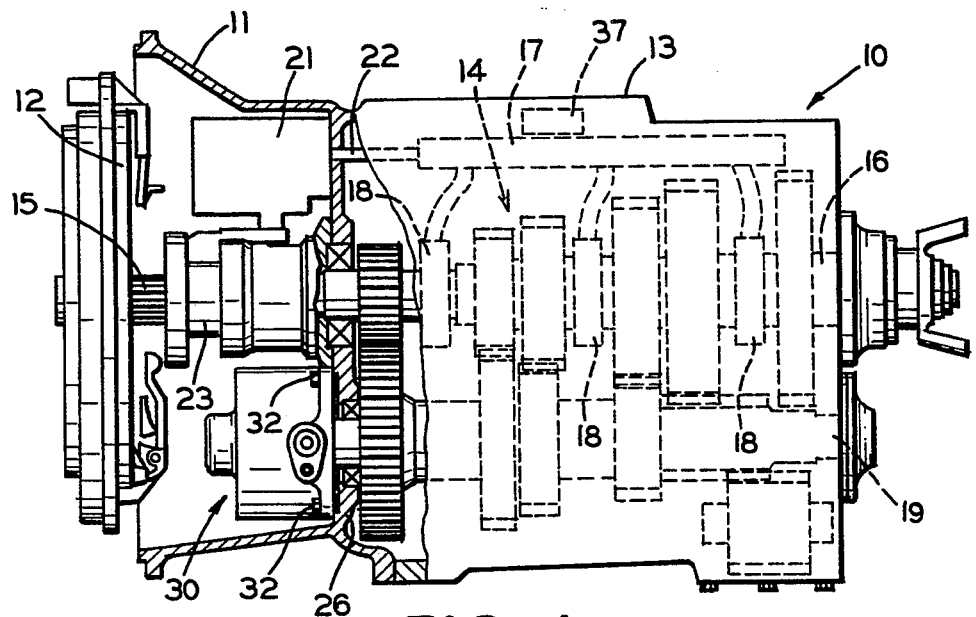
FIG. 1 is a side elevational view, partially broken away, of a vehicle transmission including a hill holder in accordance with this invention.

Referring now to the drawings, there is illustrated in FIG. 1 a vehicle transmission, indicated generally at 10. The transmission 10 includes a bell housing 11 which protectively encloses a conventional clutch assembly 12. The clutch assembly 12 is connected to an engine (not shown) for the vehicle. As is well known, the clutch assembly 12 is rotatably driven by the engine in a predetermined rotational direction. For the purposes of explanation throughout this discussion, it will be assumed that the clutch assembly 12 is driven in a clockwise rotational direction when viewed from the left in FIG. 1.

The bell housing 11 is connected to a main case 13 for the transmission 10. The main case 13 protectively encloses conventional transmission gearing, indicated generally at 14, and associated shifting components. A rear wall 11a of the bell housing 11 separates the clutch assembly 12 from the transmission gearing 14 contained within the main case 13. The clutch assembly 12 is connected to a transmission input shaft 15. Thus, the input shaft 15 is rotatably driven in the same rotational direction (clockwise) as the clutch assembly 12. The input shaft 15 is connected through the transmission gearing 14 to a co-axially aligned transmission output shaft 16. The transmission gearing 14 is shifted by means of a plurality of axially moveable shift rails 17 (only one of which can be seen in FIG. 1). Each of the shift rails 17 is connected to a respective shift collar 18 for effecting the shifting movement thereof.

The transmission 10 includes a countershaft 19 which extends parallel to, but is spaced apart from, the input shaft 15 and the output shaft 16. As shown in FIG. 1, the countershaft 19 is connected so as to be constantly rotatably driven by the input shaft 15 in a direction which is opposite to the direction of rotation of the input shaft 15. Thus, in the illustrated embodiment, the countershaft 19 is rotatably driven in a counter-clockwise direction. In use, the transmission 10 normally transmits power from the input shaft 15 through the countershaft 19 and the selected gearing 14 to the output shaft 16. However, the transmission 10 may be operated in a direct drive mode, wherein the output shaft 16 is directly connected to the input shaft 15. In this mode, the countershaft 19 is continued to be rotatably driven by the input shaft 15, but is not involved in the power transmission path. Also, the transmission may be operated in a neutral mode, wherein the output shaft 16 is disconnected from the input shaft 15. In this mode as well, the countershaft 19 is continued to be rotatably driven by the input shaft 15, but is not involved in the power transmission path.

Regardless of the mode of operation of the transmission 10, it will be appreciated that (1) the input shaft 15 is always driven by the engine in the clockwise direction and (2) the countershaft 19 is always driven by the input shaft 15 in the counter-clockwise direction. This is true whether the transmission gearing 14 is selected for a forward gear ratio, a reverse gear ratio, or neutral. The only time that the input shaft 15 and the countershaft 19 can be rotated in the opposite directions (counter-clockwise for the input shaft 15 and clockwise for the countershaft 19) is when the clutch assembly 12 is disengaged and when the vehicle is rolling in a direction which is opposite to the direction of the selected gear ratio in the transmission gearing 14. This is because the wheels of the vehicle back drive the transmission gearing 14.

The transmission 10 illustrated in FIG. 1 is an automated manual transmission, i.e., a manual transmission having control mechanisms for automatically actuating the clutch assembly 12 and shifting transmission gearing 14. As shown in FIG. 1, a gear shift actuating mechanism 21 is located in the upper portion of the bell housing 11. The gear shift actuating mechanism 21 is connected to the shift rails 17 of the transmission 10 by actuating rods 22 which extend through the rear wall 11a of the bell housing 11. The clutch assembly 12 is operated by an actuating cylinder 23.

The gear shift actuating mechanism 21 and the clutch actuating cylinder 23 are automatically operated by a conventional electronic control system (not shown). The electronic control system monitors various operating parameters of the vehicle, such as road speed, engine speed, gear position, and the like, and controls the shifting of the transmission 10 in accordance with predetermined operating parameters. Alternatively, the transmission 10 may be a non-automated manual transmission. In either event, the structure of the transmission 10 thus far described is conventional in the art.

A hill holder, indicated generally at 30, is provided within the transmission 10. The hill holder 30 is located in the lower portion of the bell housing 11. As will be explained in detail below, the hill holder 30 cooperates with the countershaft 19 to permit rotational movement thereof in the counter-clockwise direction (the direction in which the countershaft 19 is driven by the engine). At the same time, the hill holder 30 prevents rotational movement of the countershaft 19 in the clockwise direction (the direction opposite to the direction in which the countershaft 19 is driven by the engine).

Figure 2:
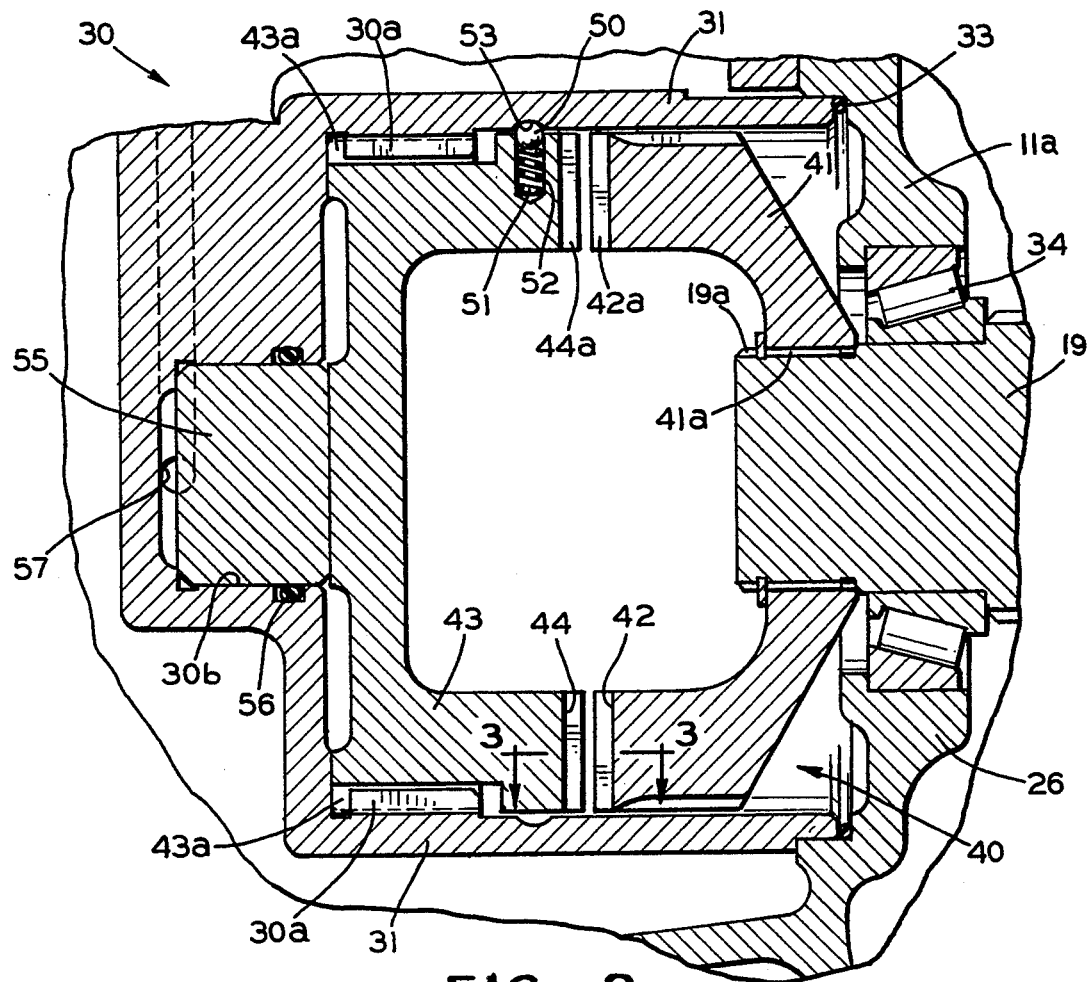
FIG. 2 is an enlarged sectional elevational view of the hill holder illustrated in FIG. 1.

Referring now to FIG. 2, the structure of the hill holder 30 is illustrated in detail. As shown therein, the hill holder 30 includes a cylindrical housing 31 which is supported on the rear wall 11a of the bell housing 11 in co-axial relationship with the countershaft 19. The housing 31 can be secured to the rear wall 11a by a plurality of bolts 32 (shown in FIG. 1). An O-ring 33 is sealingly positioned between the housing 31 and the rear wall 11a of the bell housing 11. The forward end of the countershaft 19 extends through the rear wall 11a of the bell housing 11 into the hill holder 30. The countershaft 19 is rotatably supported in the rear wall 11a by a tapered roller bearing assembly 34.

The hill holder 30 further includes a clutch assembly, indicated generally at 40, for selectively connecting the countershaft 19 to the housing 31 to prevent rotation of the countershaft 19 in one rotational direction. To accomplish this, the clutch assembly 40 includes a hub member 41 which is disposed within the housing 31. The hub member 41 is generally hollow and cylindrical in shape, including a rearwardly end having an axial bore formed therethrough. Internal splines 41a are formed on the inner surface of the hub member bore. These internal hub member splines 41a cooperate with corresponding external splines 19a formed on the outer surface of the forward end portion of the countershaft 19. As a result, the hub member 41 is fixed for rotation with the countershaft 19.

The forward end of the hub member 41 has a forwardly facing annular end face having a plurality of radially extending, ramp-shaped teeth, indicated generally at 42, formed thereon. The teeth 42 extend circumferentially about the annular end face of the hub member 41. Each tooth 42 includes a ramp portion 42a, an outer end portion 42b, and a face portion 42c. Preferably, the outer end portion 42b extends perpendicular to the longitudinal axis of the hub member 41. The ramp portions 42a preferably extend at an angle of approximately ten degrees relative to the outer end portions 42b, while the face portions 42c extend perpendicular relative to the ramp portions 42a. Also, the teeth 42 are preferably circumferentially spaced apart from one another by about twenty degrees. The purpose of these teeth 42 will be explained below.

The clutch assembly 40 further includes a generally hollow and cylindrical reaction member 43 which is disposed co-axially with the hub member 41 within the housing 31. The reaction member 43 has an outer surface which is provided with a plurality of axially extending splines 43a. The reaction member splines 43a cooperate with corresponding splines 30a formed on the inner surface of the housing 31. Thus, the reaction member 43 can move axially relative to the housing 31, but is restrained from rotating relative thereto.

Figure 3:
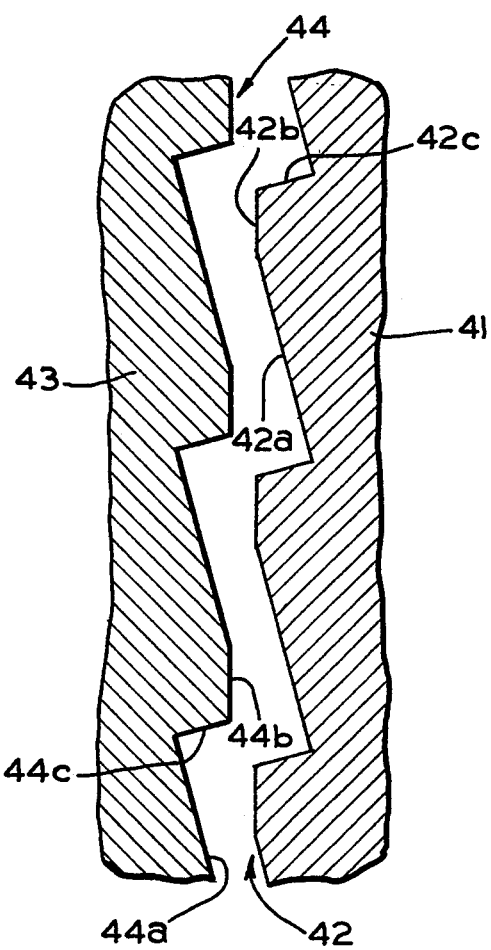
FIG. 3 is a sectional elevational view taken along the line 3—3 of FIG. 2.

The rearward end of the reaction member 43 has a rearwardly facing annular end face having a plurality of radially extending, ramp-shaped teeth, indicated generally at 44, formed thereon. The teeth 44 are similar to the teeth 42 described above, including ramp portions 44a, outer end portions 44b, and face portions 44c. Also, the teeth 44 are shaped and spaced apart from one another as with the teeth 42. However, as shown in FIG. 3, the teeth 44 are oriented in an opposite rotational direction from the teeth 42. The purpose of these teeth 44 will be explained below.

As mentioned above, the reaction member 43 is axially slidable within the housing 31. Such sliding movement is permitted between a disengaged position (shown in FIG. 2) and an engaged position (toward the right from the disengaged position). When the reaction member 43 is in the disengaged position illustrated in FIG. 2, the teeth 44 formed on the rearwardly facing end face thereof are spaced apart from the teeth 42 formed on the forwardly facing end surface of the hub member 41. Thus, the reaction member 43 is disengaged from the hub member 41. As a result, the hub member 41 (and the countershaft 19 splined thereto) are free to rotate in either rotational direction relative to the reaction member 43 and the housing 31. This is the disengaged mode of operation for the hill holder 25.

In a manner which will be described below, the reaction member 43 can be moved from the illustrated disengaged position toward the right to an engaged position. When the reaction member 43 is in the engaged position, the teeth 44 formed on the rearwardly facing end face thereof are engaged with the teeth 42 formed on the forwardly facing end surface of the hub member 41. Thus, the reaction member 43 is engaged with the hub member 41. Because of the mating ramp-shaped configuration of the teeth 42 and 44, the hub member 41 (and the countershaft 19 splined thereto) can rotate in one rotational direction (counter-clockwise) relative to the reaction member 43 and the housing 31, but are restrained from rotating in the opposite rotational direction (clockwise). This is the engaged mode of operation for the hill holder 30.

Means are provided for normally retaining the reaction member 43 in the disengaged position. In the illustrated embodiment, this retaining means includes a ball 50 which is disposed within a bore 51 formed in the outer circumferential surface of the reaction member 43. The ball 50 is biased radially outwardly by a spring 52 disposed within the bore 51 into a recess 53 formed in the inner circumferential surface of the housing 31. When the reaction member 43 is in the disengaged position, the spring 52 urges the ball 51 outwardly into engagement with the recess 53. As a result, the reaction member 43 is releasably retained in the disengaged position. If desired, a plurality of such ball and spring arrangements may be provided about the periphery of the reaction member 43.

Means are also provided for moving the reaction member 43 from the disengaged position illustrated in FIG. 2 to the engaged position. In the illustrated embodiment, this moving means includes a piston 55 which is slidably mounted in a recess 30b formed in the forward end of the housing 31. The piston 55 is preferably disposed co-axially with the reaction member 43 and the hub member 41. An O-ring 56 provides a fluid tight seal between the piston 55 and the recess 30b of the housing 31. The piston 55 abuts a forwardly facing end portion of the reaction member 43.

A passageway 57 is formed through the housing 31 which communicates with the recess 30b. As will be explained in detail below, the passageway 57 also communicates selectively with a source of pressurized fluid. When it is desired to engage the hill holder 30, the passageway 57 is placed in communication with the source of pressurized fluid. As a result, the piston 55 and the reaction member 43 are urged rearwardly (toward the right when viewing FIG. 2). Consequently, the reaction member 43 is moved toward the right from the illustrated disengaged position to the engaged position. When it is desired to disengage the hill holder 30, fluid communication between the passageway 57 and the source of pressurized fluid is interrupted. As a result, the piston 55 and the reaction member 43 are urged forwardly (toward the left when viewing FIG. 2) by virtue of the ramp portions 42a and 44a of the teeth 42 and 44, respectively. Consequently, the reaction member 43 is moved toward the left from the engaged position to the disengaged position. The reaction member 43 is thereafter maintained in the disengaged position by means of the ball and spring arrangements described above.

Figure 4:
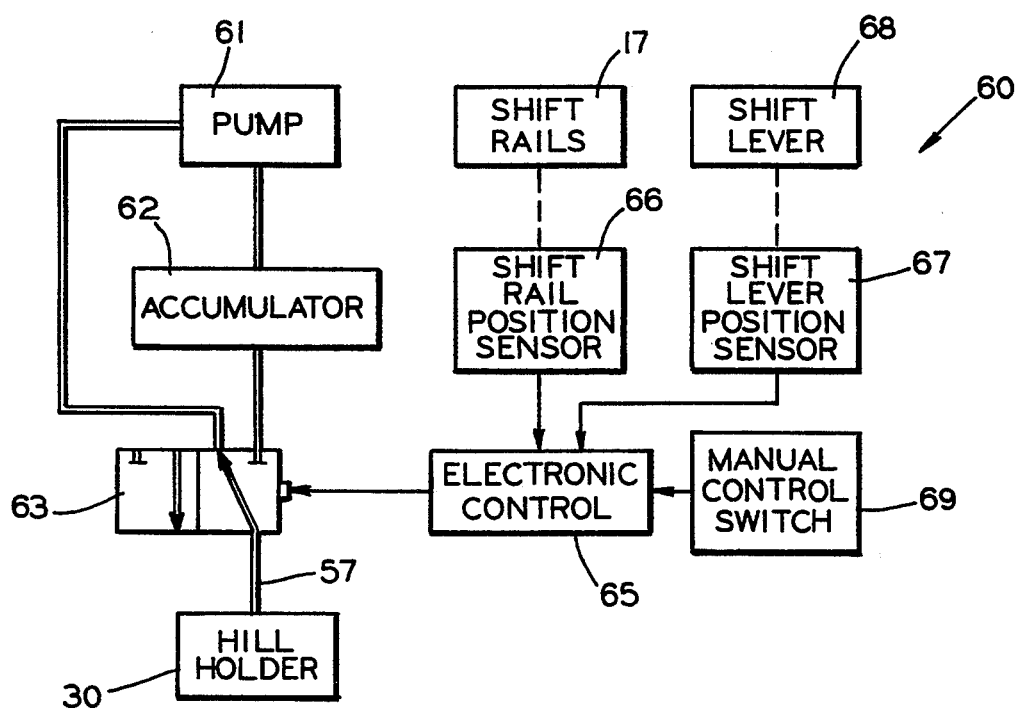
FIG. 4 is a block diagram of a control system adapted to operate the hill holder illustrated in FIGS. 1 through 3.

Referring now to FIG. 4, there is illustrated a block diagram of a control system, indicated generally at 60, which is adapted to operate the hill holder 30 illustrated in FIGS. 1 through 3. As shown therein, the control system 60 includes a pump 61 which supplies hydraulic fluid to an accumulator 62. Thus, the hydraulic fluid in the accumulator 62 is charged up to and maintained at a predetermined pressure by the pump 61. The accumulator 62 is connected through a solenoid valve 63 to the passageway 57 which communicates with the hill holder 30. The solenoid valve 63 is normally maintained in a de-energized position, as shown in FIG. 4. In that de-energized position, the solenoid valve 63 prevents the passage of pressurized hydraulic fluid from the accumulator 62 to the passageway 57. Simultaneously, the solenoid valve 63 vents the passageway 57 to the pump 61. As will be explained below, the solenoid valve 63 can be moved to an energized position. In that energized position, the solenoid valve 63 permits the passage of pressurized hydraulic fluid from the accumulator 62 to the passageway 57.

An electronic control circuit 65 is provided for controlling the operation of the solenoid valve 63. To accomplish this, the control circuit 65 receives signals generated by one or more shift rail position sensors 66 (only one is illustrated for simplicity). The shift rail position sensors 66 are adapted to generate electrical signals when their associated shift rails 17 in the transmission 10 are in their neutral positions. The control circuit 65 also receives signals from a shift lever position sensor 67. The shift lever position sensor 67 is connected to a driver actuated shift lever 68. The shift lever position sensor 67 generates a signal to the control circuit 65 which is representative of the gear position selected by the driver, as determined by the position of the shift lever 68.

In operation, the electronic control circuit 65 normally maintains the solenoid valve 63 in the illustrated de-energized position, thus preventing the flow of hydraulic fluid from the accumulator 62 to the passageway 57. As a result, the hill holder 30 is maintained in the disengaged position discussed above, and the countershaft 19 is free to rotate relative thereto. This mode of operation is maintained while the vehicle is operated in an area where the function performed by the hill holder 30 is not required.

Under certain circumstances, however, it is desirable to operate the hill holder 30 in the engaged mode. To accomplish this, the solenoid valve 63 is activated to its energized position, thus permitting the flow of hydraulic fluid from the accumulator 62 to the passageway 57. As a result, the reaction member 43 is moved to the engaged position discussed above, and the teeth 44 thereof engage the teeth 42 formed on the hub member 41. Because of the blocking engagement of the face portions 42c and 44c of the teeth 42 and 44, respectively, the countershaft 19 is prevented from rotating in a clockwise direction relative to the fixed reaction member 43. As discussed above, such clockwise rotation of the countershaft 19 occurs only when the clutch assembly 12 is disengaged and when the vehicle is rolling in a direction which is opposite to the direction of the selected gear ratio in the transmission gearing 14. Thus, this undesirable occurrence is prevented by the hill holder 30.

Notwithstanding this, however, the countershaft 19 is free to rotate in the counter-clockwise direction even when the hill holder 30 is operated in the engaged mode. This is because of the smooth engagement of the ramp portions 42a and 44a of the teeth 42 and 44, respectively. Such ramp portions 42a and 44a lightly ratchet over one another when the countershaft 19 rotates in a counter-clockwise direction relative to the fixed reaction member 43. As a result, the desired operation of the vehicle is not affected by the engagement of the hill holder 30.

The electronic control circuit 65 can be embodied as a conventional microprocessor which is programmed to be responsive to the various signals described above to activate the solenoid valve 63 as desired. For example, the electronic control circuit 65 can be programmed to maintain the solenoid valve 63 in the illustrated deactivated condition unless certain parameters are sensed. Such parameters may include activating the solenoid valve 63 whenever the shift lever 68 is moved out of a neutral position or whenever any of the shift rails 17 are moved out of their neutral positions.

Additionally, a manual control switch 69 may be directly connected to the electronic control circuit The manual control switch 69 is actuated by the vehicle driver whenever the driver wishes to engage the hill holder 30. The electronic control circuit 65 is responsive to actuation of the manual control switch 69 for automatically activated the solenoid valve 63 to engage the hill holder 30, regardless of the condition of the sensors 66 and 67.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A hill holder for a vehicle transmission including a shaft which normally rotates in a predetermined rotational direction about an axis, said hill holder for preventing the shaft from rotating in a direction opposite to the predetermined rotational direction and comprising:
   a housing;
   a hub member adapted to be connected to the shaft for rotation therewith about the axis, said hub member having at least one axially extending tooth formed thereon;
   a reaction member connected to said housing, said reaction member having at least one axially extending tooth formed thereon; and
   means for moving one of said hub member and said reaction member axially toward the other for selectively causing axial engagement of said hub member tooth with said reaction member tooth to prevent said hub member from rotating in the direction opposite to the predetermined rotational direction.

2. The hill holder defined in claim 1 wherein said hub member tooth and said reaction member tooth are shaped to permit said hub member to rotate in the predetermined rotational direction while preventing said hub member from rotating in the opposite rotational direction when said teeth are engaged.

3. The hill holder defined in claim 2 wherein said hub member tooth and said reaction member tooth are generally ramp-shaped.

4. The hill holder defined in claim 1 wherein said hub member has a plurality of axially extending teeth formed thereon and said reaction member has a plurality of axially extending teeth formed thereon, and wherein said means for moving causes axial engagement of said hub member teeth with said reaction member teeth to prevent said hub member from rotating in the opposite rotational direction.

5. The hill holder defined in claim 4 wherein said hub member teeth and said reaction member teeth are shaped to permit said hub member to rotate in the predetermined rotational direction while preventing said hub member from rotating in the opposite rotational direction when said teeth are engaged.

6. The hill holder defined in claim 5 wherein said hub member teeth and said reaction member teeth are generally ramp-shaped.

7. The hill holder defined in claim 1 wherein said reaction member is axially movable between an engaged position, wherein said hub member tooth is engaged with said reaction member tooth to prevent said hub member from rotating in the opposite rotational direction, and a disengaged position, wherein said hub member tooth is not engaged with said reaction member tooth.

8. The hill holder defined in claim 7 wherein said means for moving includes means for moving said reaction member between said engaged and disengaged positions.

9. The hill holder defined in claim 7 further including means for releasably retaining said reaction member in said disengaged position.

10. A vehicle transmission comprising:
    a housing;
    an input shaft;
    an output shaft;
    gear means connected between said input shaft and said output shaft for providing a rotational driving connection therebetween at a desired speed ratio, said gear means including a transmission shaft which normally rotates in a predetermined rotational direction about an axis; and
    a hill holder for preventing said transmission shaft from rotating in a direction opposite to the predetermined rotational direction, said hill holder including a hub member connected to said transmission shaft for rotation therewith about the axis and having at least one axially extending tooth formed thereon, a reaction member connected to said housing and having at least one axially extending tooth formed thereon, and means for moving one of said hub member and said reaction member axially toward the other for selectively causing engagement of said hub member tooth with said reaction member tooth to prevent said hub member from rotating in the direction opposite to the predetermined rotational direction.

11. The hill holder defined in claim 10 wherein said hub member tooth and said reaction member tooth are shaped to permit said hub member to rotate in the predetermined rotational direction while preventing said hub member from rotating in the opposite rotational direction when said teeth are engaged.

12. The hill holder defined in claim 11 wherein said hub member tooth and said reaction member tooth are generally ramp-shaped.

13. The hill holder defined in claim 10 wherein said hub member has a plurality of axially extending teeth formed thereon and said reaction member has a plurality of axially extending teeth formed thereon, and wherein said means for moving causes axial engagement of said hub member teeth with said reaction member teeth to prevent said hub member from rotating in the opposite rotational direction.

14. The hill holder defined in claim 13 wherein said hub member teeth and said reaction member teeth are shaped to permit said hub member to rotate in the predetermined rotational direction while preventing said hub member from rotating in the opposite rotational direction when said teeth are engaged.

15. The hill holder defined in claim 14 wherein said hub member teeth and said reaction member teeth are generally ramp-shaped.

16. The hill holder defined in claim 10 wherein said reaction member is axially movable relative to said housing between an engaged position, wherein said hub member tooth is engaged with said reaction member tooth to prevent said hub member from rotating in the opposite rotational direction, and a disengaged position, wherein said hub member tooth is not engaged with said reaction member tooth.

17. The hill holder defined in claim 16 wherein said means for moving includes means for moving said reaction member between said engaged and disengaged positions.

18. The hill holder defined in claim 17 wherein said means for moving includes a piston disposed in said housing adjacent to said reaction member and means for moving said piston to move said reaction member between said engaged and disengaged positions.

19. The hill holder defined in claim 16 further including means for releasably retaining said reaction member in said disengaged position.

20. The hill holder defined in claim 19 wherein said means for releasably retaining includes a ball disposed in a bore formed in said reaction member which is resiliently urged into engagement with a recess formed in said housing.

* * * * *